United States Patent [19]

Yazaki et al.

[11] Patent Number: 5,872,607
[45] Date of Patent: Feb. 16, 1999

[54] LIQUID CRYSTAL DISPLAY DEVICE AND METHOD FOR PRODUCING SUCH

[75] Inventors: Masayuki Yazaki; Hidekazu Kobayashi; Shuhei Yamada; Hidehito Iisaka; Yutaka Tsuchiya; Eiji Chino, all of Suwa, Japan

[73] Assignee: Seiko Epson Corporation, Tokyo, Japan

[21] Appl. No.: 702,490

[22] PCT Filed: Dec. 26, 1995

[86] PCT No.: PCT/JP95/02696

§ 371 Date: Aug. 27, 1996

§ 102(e) Date: Aug. 27, 1996

[87] PCT Pub. No.: WO96/20425

PCT Pub. Date: Jul. 4, 1996

[30] Foreign Application Priority Data

Dec. 27, 1994 [JP] Japan ............ 6/326486

[51] Int. Cl.$^6$ .................. G02F 1/137; G02F 1/1337
[52] U.S. Cl. ............... 349/86; 349/93; 349/126
[58] Field of Search ................ 349/86, 93, 88, 349/51, 89, 113, 165, 126, 94, 92

[56] References Cited

U.S. PATENT DOCUMENTS

| | | |
|---|---|---|
| 4,376,567 | 3/1983 | Banda . |
| 4,991,940 | 2/1991 | Dalisa et al. ............ 349/68 |
| 5,138,472 | 8/1992 | Jones et al. ............ 349/166 |
| 5,305,126 | 4/1994 | Kobayashi et al. . |
| 5,408,344 | 4/1995 | Takiguchi ............ 349/65 |

FOREIGN PATENT DOCUMENTS

| | | |
|---|---|---|
| 488116A2 | 6/1992 | European Pat. Off. . |
| 56-156816 | 12/1981 | Japan . |
| A-227684 | 8/1992 | Japan . |
| 5-119302 | 5/1993 | Japan . |
| 5-196943 | 8/1993 | Japan . |
| 7-36022 | 2/1995 | Japan . |

*Primary Examiner*—Hung X. Dang
*Assistant Examiner*—Tai V. Duong
*Attorney, Agent, or Firm*—Oliff & Berridge, PLC

[57] ABSTRACT

A polymer dispersed liquid crystal display device includes a top substrate and a bottom substrate. First electrodes are provided on the top substrate and second electrodes are provided on the bottom substrate. Orientation are provided on the top and the bottom substrates. The orientation films are respectively rubbed in predetermined directions. A polymer material, a liquid crystal material and a predetermined amount of a chiral agent are interposed between the top and bottom substrates. The polymer material is separated from the liquid crystal material through irradiation by ultraviolet rays. The liquid crystal material and polymer material have a mutually orientated and dispersed structure. The liquid crystal material has a predetermined twisting angle in a predetermined twist direction. As a result, light is scattered when substantially normal to the liquid crystal display device and the surface of the top substrate. Thus, a polymer dispersed liquid crystal display device is obtained that is particularly bright in a specific direction.

22 Claims, 6 Drawing Sheets

SCATTERING DIRECTIVITY OF 90° CELL

SCATTERING DIRECTIVITY OF 180° CELL

TWISTING ANGLE AND MAXIMUM REFLECTANCE

TWISTING ANGLE AND V10 AND V90

SCATTERING DIRECTIVITY OF 0° CELL

SCATTERING DIRECTIVITY OF 90° CELL

SCATTERING DIRECTIVITY OF 180° CELL

SCATTERING DIRECTIVITY OF 270° CELL

SCATTERING DIRECTIVITY OF 360° CELL

SCATTERING DIRECTIVITY OF 450° CELL

LIQUID CRYSTAL DISPLAY DEVICE AND METHOD FOR PRODUCING SUCH

BACKGROUND OF THE INVENTION

1. Field of Invention

The present invention relates to a liquid crystal display device and a method for manufacturing it. More particularly, the present invention relates to a liquid crystal display device comprising the display component of an information equipment terminal, television or home appliance product, and a method of manufacturing the liquid crystal display device.

2. Description of Related Art

In recent years, as information equipment has become more compact and lightweight, display devices to be mounted on such equipment have been sought which consume less power. Liquid crystal display devices using the twist nematic (TN) mode are utilized as reflective displays in small display capacity equipment, while liquid crystal display devices using the film compensate super twist nematic (FTN) mode are utilized in the mid-range display capacity equipment. Furthermore, uses wherein an information input apparatus such as a tablet or the like is included on the reflective-type display are also expanding. All these reflective-type liquid crystal display devices require brightness and good visibility.

However, TN-format and FTN-format liquid crystal display devices that use conventional polarizing plates have low light utilizing efficiency. A problem then arises in that the TN- and FTN-format liquid crystal displays become dark when made reflective. Moreover, an extremely dark display results when an information input apparatus such as a tablet or the like is included. In addition, because a reflective plate is placed over the polarizing plate on the back surface of the substrate to make a reflective model with the TN format or FTN format, double images occur in the display, small characters are unclear, and there are problems with visibility.

On the other hand, bright reflective-type displays that do not use polarizing plates have come to be developed recently. For example, a liquid crystal display device that uses a polymer dispersion liquid crystal in which liquid crystal and polymer are mutually dispersed, and which is controlled so that the display is transparent when an electric field is impressed and the light is scattered when no electric field is impressed has been disclosed (Japanese Laid-Open Patent Publication 58-501631). Other liquid crystal display devices, which are controlled so that the light is scattered when an electric field is impressed, and the display is transparent or light is absorbed when no electric field is impressed have been also been disclosed (European Patent Application EPO 488116A2, Japanese Laid-Open Patent Publication 4-227684, Japanese Laid-Open Patent Publication 5-119302).

In particular, in the polymer dispersion-type liquid crystal display device using a polymer dispersion liquid crystal, disclosed in European Patent Application EPO 488116A2, in which the liquid crystal and polymer are mutually orientation dispersed, it is possible to also use the electrodes as light reflecting surfaces because no polarizing plate is used. In this case, good visibility, high precision and brightness, which cannot be achieved in the TN and FTN modes that require polarizing plates, are obtained, and it is possible to obtain a reflective display with superior display quality.

However, with the conventional art that has been disclosed with regard to polymer dispersion-type liquid crystal display devices that use polymer dispersion liquid crystal in which the liquid crystal and polymer are mutually orientation dispersed, no control method for the light scattering properties that influence the field angle properties and brightness has been disclosed. In particular, when the device is used as a reflective-type display, the influence that the usage environment and the display positioning has on the display quality is large, but no design method for a liquid crystal display device which takes these points into consideration has been disclosed.

When the liquid crystal display device is mounted on portable equipment, the usage environment can roughly be separated into indoor and outdoor environments. Outdoors, a brightness approximately 100 times that of a general office exists. Because the scattering-type reflective display has an extremely bright display state, brightness is not an important factor in a design that assumes an outdoor environment. In contrast, in a design that assumes an indoor environment, brightness is an important factor. Furthermore, efficient scattering is required in environments that have a large incident light component coming from the upward direction.

In addition, when the liquid crystal display device is mounted on portable equipment, control of the viewing angle properties is necessary to provide privacy protection.

In consideration of the foregoing, it is an objective of the present invention to provide a liquid crystal display device that controls the light scattering properties of a polymer dispersion-type liquid crystal display device using a polymer dispersion liquid crystal with the liquid crystal and polymer mutually orientation dispersed such that the display is particularly bright in a specific direction, and for which the contrast ratio is high. It is also an objective of the present invention to provide a method for producing such a device.

SUMMARY OF THE INVENTION

A liquid crystal display device in accordance with the invention is of the type comprised of a liquid crystal and a polymer having refractive index anisotropy, the orientations of which are mutually dispersed. The liquid crystal and the polymer are interposed between a top substrate in which first electrodes are formed and the surface is orientation processed, and a bottom substrate in which second electrodes facing the first electrodes are formed and the surface is orientation processed. The light scattering properties upon applying an electric field are adjusted by a first rubbing direction caused by the orientation processing performed on the top substrate, a second rubbing direction caused by the orientation processing performed on the bottom substrate, the twisting angle of the liquid crystal, and the twisting direction of the liquid crystal. The incident surface that efficiently scatters the light substantially matches the surface containing the direction normal to the surface of the top substrate of the liquid crystal display and a predetermined first direction within the top substrate surface.

In this way, the incident surface that efficiently scatters the light substantially matches the plane containing a predetermined first direction in the top substrate surface and the normal direction to the surface of the top substrate of the liquid crystal display device, and consequently, a liquid crystal display device is obtained which is bright in a direction based on the specific application of the liquid crystal display device.

Because the predetermined first direction is the direction determined by the first rubbing direction of the top substrate being rotated angularly through about ½ of the angle formed by the first rubbing direction and the second rubbing direction, moving from the first rubbing direction of the top substrate to the second rubbing direction of the bottom substrate, it is possible to easily design a liquid crystal display device having brightness in a specific direction. That is, the first and the second rubbing directions can be adjusted to produce a liquid crystal display device with brightness in a given direction.

The predetermined first direction is the vertical direction of the top substrate in the usage state (e.g., indoors and outdoors) of the liquid crystal display device. In this way, a liquid crystal display device is obtained that is suitable for usage in environments with large light incidence scattering from the upward direction, which occurs particularly indoors.

If the first rubbing direction of the top substrate is a direction rotated angularly by about ½ of the twisting angle of the liquid crystal, from the left-to-right direction of the top substrate (in the usage state of the liquid crystal display device) to the twisting direction of the liquid crystal, and the second rubbing direction of the bottom substrate is a direction having linear symmetry with the first rubbing direction with respect to the vertical direction of the top substrate, it is possible to easily obtain a liquid crystal display device that is bright in the up-and-down direction in the usage state of the liquid crystal display device.

It is preferable for the liquid crystal to contain a chiral component in a predetermined amount in accordance with the twisting angle of the liquid crystal.

It is preferable for the liquid crystal to contain a dichroic dye.

It is preferable for the second electrodes of the bottom substrate to be formed of a reflective material, and the present invention may be suitably applied to a reflective-type liquid crystal display device.

A method is provided for producing a liquid crystal display device comprising a liquid crystal and a polymer having refractive index anisotropy, the orientations of which are mutually dispersed, interposed between a top substrate in which first electrodes are formed and the surface is orientation processed, and a bottom substrate in which second electrodes facing these first electrodes are formed and the surface is orientation processed, with the liquid crystal being twist-orientated with a predetermined twisting angle in a predetermined twisting direction between the top substrate and the bottom substrate. The method includes the steps of: forming the first electrodes in the top substrate; forming a first alignment film on the top substrate; rubbing the first alignment film in a first rubbing direction that has been rotated angularly by about ½ of the twisting angle of the liquid crystal from the left-to-right direction of the top substrate in the usage state of the liquid crystal display device toward the twisting direction of the liquid crystal; forming, on the bottom substrate, second electrodes capable of facing the first electrodes; forming a second alignment film on the bottom substrate; rubbing the second alignment film in a second rubbing direction that is a direction having linear symmetry or point symmetry with the first rubbing direction with respect to the vertical direction of the top substrate in the usage state of the liquid crystal display device; forming a hollow panel using the first substrate and the second substrate; placing a liquid crystal mixture material composed of a liquid crystal composite and a polymer or polymer precursor between the first and second substrates of the hollow panel; and, separating out the polymer from the liquid crystal mixture material to cause phase separation between the liquid crystal and the polymer.

By producing a liquid crystal display device using this method, it is possible to easily obtain a liquid crystal display device that is bright in the up-and-down direction in the usage state of the liquid crystal display device.

It is preferable for the liquid crystal to contain a chiral component in a predetermined amount in accordance with the twisting angle of the liquid crystal, and setting the liquid crystal to a predetermined twisting angle is easy.

In addition, it is preferable to use an ultraviolet light hardening monomer as the polymer precursor and to polymize the monomer by irradiating the liquid crystal mixture material with ultraviolet rays to extract the polymer, thereby phase-separating the liquid crystal and the polymer.

DETAILED DESCRIPTION OF PREFERRED EMBODIMENTS

First Embodiment

In the first embodiment, the description will be made for a liquid crystal display device with a twist composition wherein the twisting orientation states of the liquid crystal on which parallel orientation processing is conducted are about 0°, 90°, 180°, 270° and 360°.

Figure 1:
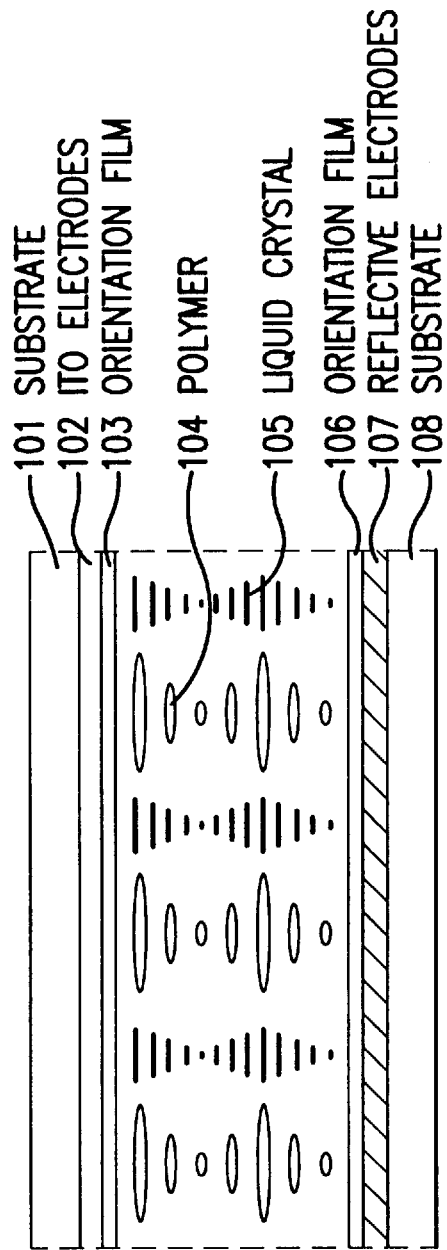
FIG. 1 is a cross-sectional view showing the liquid crystal display device of a first embodiment of the present invention.

FIG. 1 shows a cross-sectional view of the liquid crystal display device of the present embodiment. A chromium film is formed on the bottom substrate 108 to a depth of about 2000 angstroms through sputtering, following which reflective pixel electrodes 107 which have been patterned are formed. The surface area of this pixel is 15 mm$^2$.

ITO (Indium Tin Oxide) is formed on the top substrate 101 to a depth of about 1500 angstroms through sputtering, following which transparent electrodes 102 which have been patterned are formed. An alignment film 106 is formed on the reflective pixel electrodes 107, and an alignment film 103 is formed on the ITO electrodes 102. Between the orientation film 103 and the alignment film 106, a liquid crystal 105 and polymer 104 are provided so that they are mutually orientation dispersed. That is, the long molecules of the liquid crystal 105 and the long molecules of the polymer 104 are dispersed in a hollow panel, formed by sealing substrates 108 and 101, such that the molecules of the liquid crystal 105 and the polymer 104 are homogeneously mixed.

After the reflective pixel electrodes 107 have been formed on the substrate 108 and the transparent electrodes 102 have been formed on the substrate 101, Optomer AL 3046 (produced by Japan Synthetic Rubber Co. Ltd.) is flexographed as an alignment agent on the substrates 108 and 101, and is then calcinated for one hour at 180° C. to form polyimide films 106 and 103. Next, a rubbing process is accomplished using a rotating rubbing apparatus.

Next, the substrate perimeters of the two substrates 108 and 101 are bonded and fixed with about a 5 mm spacing to obtain a hollow panel.

Figure 2B:
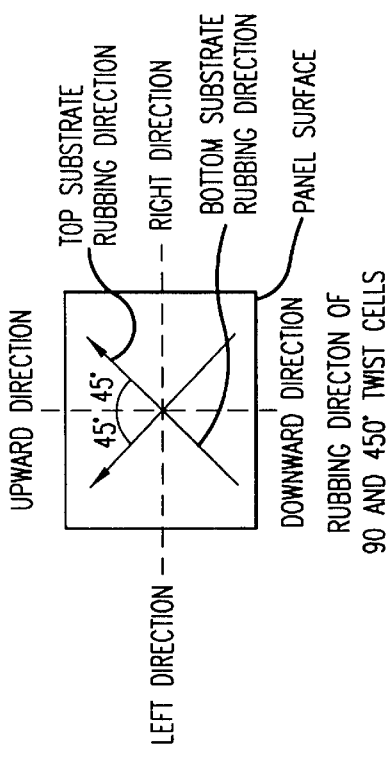
FIGS. 2A through 2D are drawings showing the top substrate rubbing direction and the bottom substrate rubbing direction in the first embodiment of the present invention.
Figure 2D:
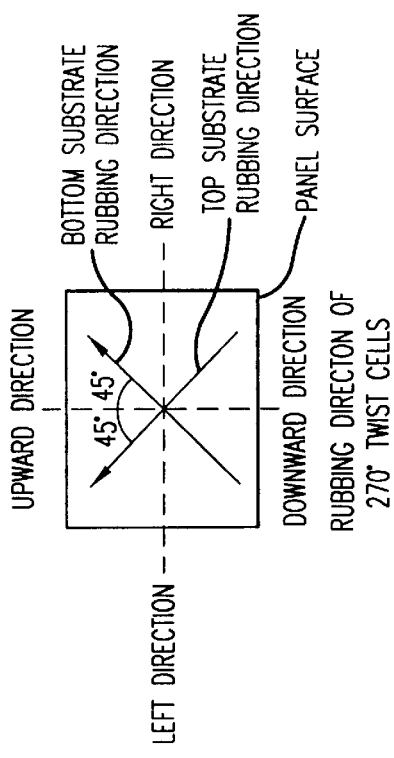
Figure 2A:
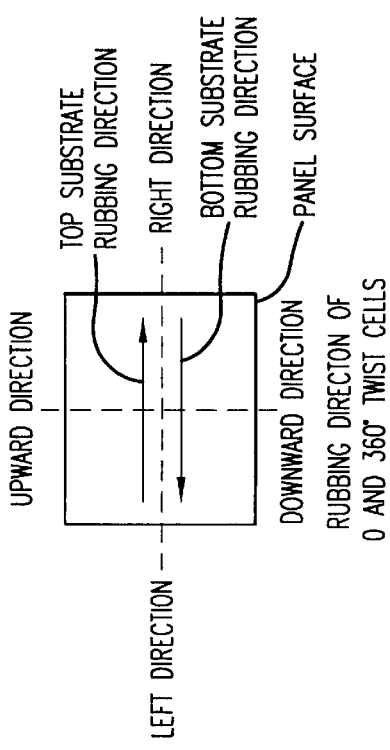
Figure 2C:
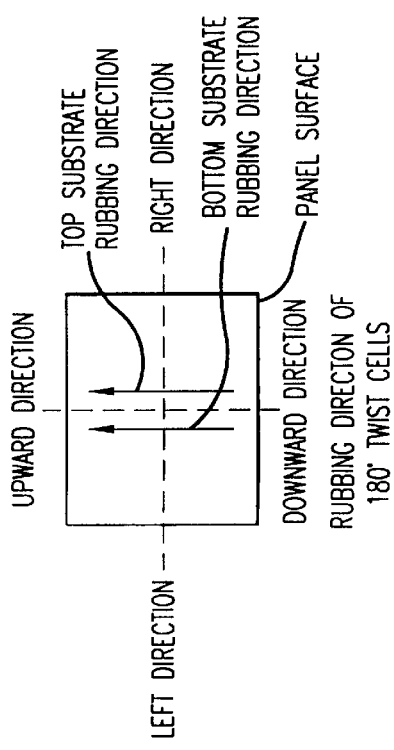

The bottom substrate rubbing direction and the top substrate rubbing direction have six levels of about 0°, 90°, 180°, 270°, 360° and 450° twisting, as shown in FIG. 2A through FIG. 2D. That is, as shown in FIG. 2A, with about 0° and 360° twisting, the top substrate is rubbed toward the right of the panel and the bottom substrate is rubbed toward the left of the panel. As shown in FIG. 2B, with about 90° and 450° twisting, the top substrate is rubbed from the bottom to the top of the panel in a direction inclined about 45° to the right from the upward direction of the panel, and the bottom substrate is rubbed from the bottom to the top of the panel in a direction inclined about 45° to the left from the upward direction of the panel. As shown in FIG. 2C, with about 180° twisting, both the top substrate and the bottom substrate are rubbed from the top to the bottom of the panel in the upward direction of the panel. As shown in FIG. 2D, with about 270° twisting, the top substrate is rubbed from the bottom to the top of the panel in a direction inclined about 45° to the left from the upward direction of the panel, and the bottom substrate is rubbed from the bottom to the top of the panel in a direction inclined about 45° to the right from the upward direction of the panel.

Next, the liquid crystal and polymer precursor mixture, which is sealed in the hollow panel, will be described. A mixture of TL-213 (produced by Merck & Co. Inc.) and BL007 (produced by Merck & Co. Inc.) in about a 7:3 ratio was used as the liquid crystal (hereafter called liquid crystal A). In addition, M361, SI512 and M137 (all produced by Mitsui Toatsu Senryo K.K.) were mixed into the liquid crystal A in ratios of about 1.4%, 1.7% and 0.4% by weight, respectively, as a dichroic dye. As a chiral component, right-turning R-1011 (produced by Merck & Co. Inc.) was added to the liquid crystal A in the amounts of about 0% by weight, 0.15% by weight, 0.30% by weight, 0.45% by weight, 0.60% by weight and 0.75% by weight in accordance with the about 0°, 90°, 180°, 270°, 360° and 450° cells, respectively, shown in FIGS. 2A through 2D. In addition, about 7% by weight of biphenyl methacrylate was added to the liquid crystal A as the polymer precursor. The liquid crystal A with the dichroic dye, chiral component and polymer precursor was heated and mixed to achieve a liquid crystal mixture material in a liquid crystal state, following which the liquid crystal mixture material was vacuum sealed in the hollow panel.

The liquid crystal mixture material that was sealed in the hollow panel has twisting orientation states of about 0°, right 90°, right 180°, right 270°, right 360° and right 450° depending on the rubbing direction and chiral agent amounts. Next, the hollow panel was irradiated for seven minutes by ultraviolet rays having a luminous intensity of about 5 mW/cm$^2$ (wavelength 350 nm) to polymerize the polymer, and through this step the polymer was separated from the liquid crystal mixture material and the liquid crystal display device of the present embodiment as shown in FIG. 1 was completed.

The liquid crystal 105 exhibited the same states as before ultraviolet ray irradiation, and in addition, the fact that the polymer 104 and the liquid crystal 105 took on a structure that was mutually orientated and dispersed between the substrates was verified by a polarizing microscope.

The electro-optical properties of the liquid crystal display device of the present embodiment that was obtained in this manner exhibited threshold properties, and a normally black property was obtained wherein the reflectance increased as the impressed voltage increased. That is, when the voltage was off, a black display was obtained through the absorption of light by the dichroic dye. When a sufficient voltage was impressed, the liquid crystal 105 was orientated in the direction of the electric field. Consequently, the orientation directions of the polymer and the liquid crystal differed, and points of discontinuity were created in the refractive index in the medium, so that a light scattering state was achieved. At this time, the absorption was extremely small because the dichroic dye was also orientated in the direction of the electric field. Thus, a white display was obtained.

Next, the results of measurements of the electro-optical properties of the liquid crystal display device of the present embodiment will be given. The electro-optical properties were measured by impressing a 100 Hz square wave on the liquid crystal display device using a xenon lamp ring light source, which caused light to be incident from all sides (360°) from a direction inclined 30° from the normal direction (panel normal) of the liquid crystal display device surface (incident angle 30°), and detecting the response reflected light of the incident light in the normal direction. The detected surface area was taken to be 2 mm $\phi$. The reflectance rate of 100% was standardized at the luminosity of the entire dispersion plate surface. Hereafter, the threshold voltage value V10 was defined to be the voltage value when the reflectance was 10 with the (maximum reflectance − minimum reflectance) standardized to 100, and the saturation voltage value V90 was defined to be the voltage value when the reflectance was 90. In addition, the scattering directivity measured the change in the reflectance in the panel normal direction using parallel light rays and with the angle $\psi$ between the parallel light rays and the panel normal and the panel rotation angle $\phi$ as parameters.

Figure 3A:
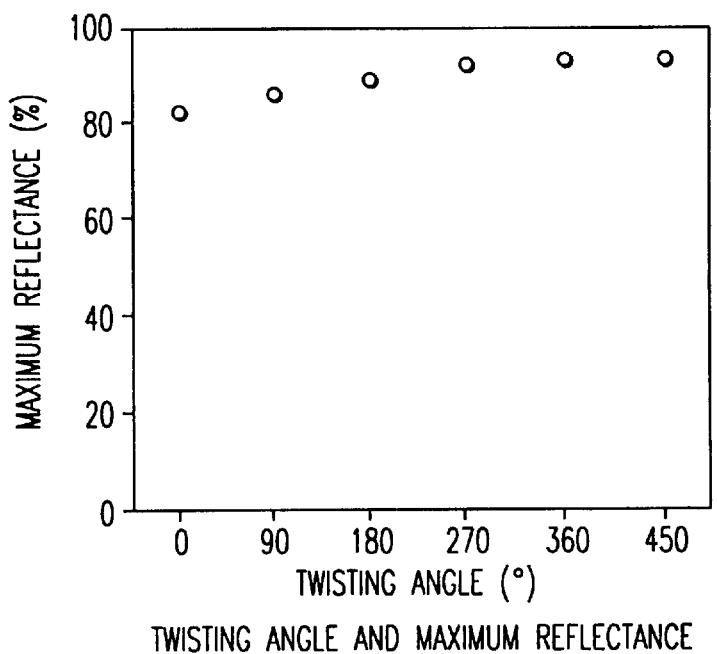
FIG. 3A is a drawing showing the relationship between the twisting angle of the liquid crystal display device and the maximum reflectance in the first embodiment of the present invention.
Figure 3B:
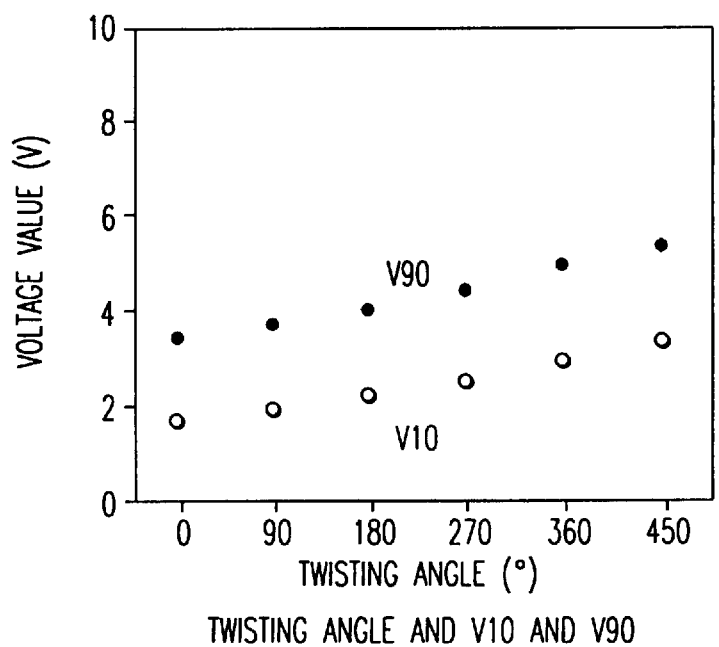
FIG. 3B is a drawing showing the relationship between the twisting angle of the liquid crystal display device and the threshold voltage V10 and the saturation voltage V90 in the first embodiment of the present invention.
Figure 4A:
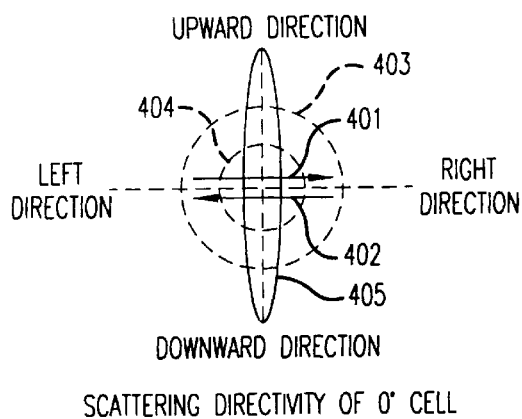
FIGS. 4A through 4F are drawings showing the scattering directivity of the liquid crystal display device of the first embodiment of the present invention.
Figure 4B:
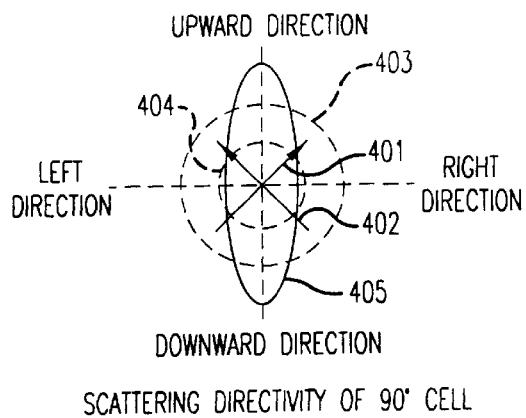
Figure 4C:
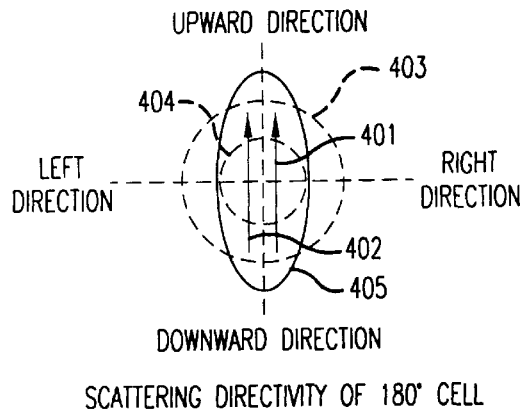
Figure 4D:
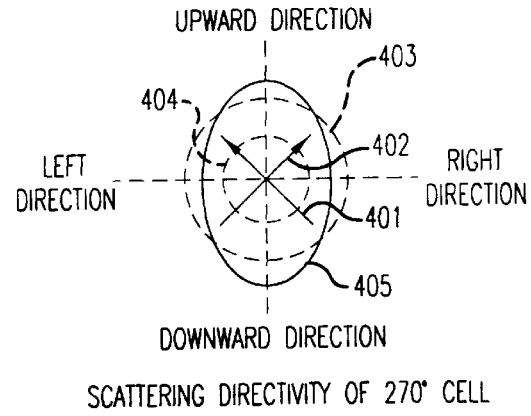
Figure 4E:
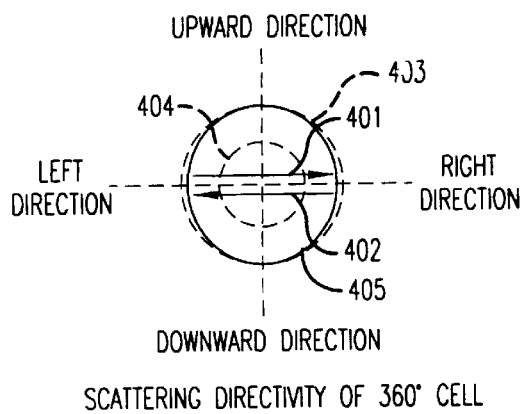
Figure 4F:
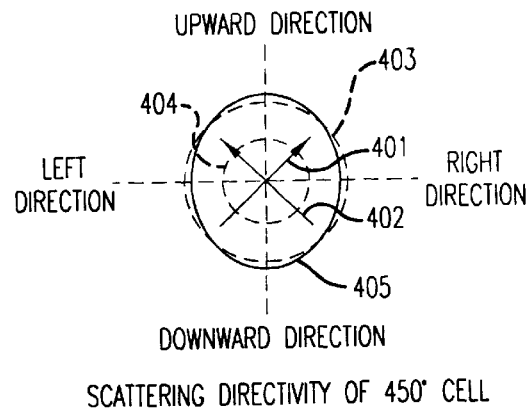

FIG. 3A shows the relationship between the twisting angle and the maximum reflectance, of the liquid crystal display device of the present embodiment. FIG. 3B shows the relationship between the twisting angle and the threshold voltage value V10 and the saturation voltage value V90. The maximum reflectance becomes larger as the twisting angle becomes larger, and is substantially constant for twisting angles of about 270° and larger. In addition, the threshold voltage value V10 and the saturation voltage value V90 both become larger as the twisting angle becomes larger.

FIGS. 4A through 4F show the scattering directivity for a $\psi=30°$ incidence when the saturation voltage is impressed. In FIGS. 4A through 4F, a reference number 401 designates the top substrate rubbing direction, a reference number 402 designates the bottom substrate rubbing direction, a reference number 403 designates a reflectance rate of 100%, a reference number 404 designates a reflectance rate of 50% and a reference number 405 designates the reflectance rate of the liquid crystal display device for a $\psi=30°$ incidence.

As shown in FIGS. 4A through 4F, the scattering directivity regularly exhibited directivity with efficient scattering in the plane containing the panel normal and the axis that is obtained by rotating the top substrate rubbing axis from the top substrate rubbing axis direction toward the bottom substrate rubbing axis direction by about ½ of the angle made by the top substrate rubbing axis and the bottom substrate rubbing axis. In addition, in the twisting states and rubbing directions shown in FIGS. 2A through 2D, a directivity scattering state was obtained which efficiently scattered light in the plane containing the panel normal and the panel up-and-down direction.

The scattering directivity exhibited strong directivity the smaller the twisting angle. In addition, the maximum reflectance was higher the larger the twisting angle and was substantially constant at about 270° and larger twisting angles. When this kind of phenomenon is caused to correspond to what is recognized by the eye, the panel becomes brighter by the twisting angle increasing under uniform lighting conditions caused by a diffusion light source, and the brightness is constant at about 270° twisting and above. In addition, in conditions with strong specific directioned light, the panel was brighter the smaller the twisting angle when the panel was optimally positioned (for example, making the up-and-down direction of the panel the direction of the specific directioned light). On the other hand, the viewing angle properties increased when the twisting angle increased.

The usage state of portable equipment can roughly be separated into indoors and outdoors environments. In the indoors and outdoors environments, the two conditions described above may overlap. Outdoors, a brightness approximately 100 times that of the general office exists, and because the scattering-type reflective display has an extremely bright display state, brightness is not a particularly important factor in a design that assumes an outdoor environment. In contrast, in a design that assumes an indoor environment, brightness is important. Furthermore, indoors, the shining of sunlight and the incident light component from the upward direction caused by lighting is large. With the present embodiment, the direction that strongly scatters light matches the vertical axis of the panel, and hence a bright display state is obtained even indoors. In addition, by adjusting the twisting angle, viewing angle properties are obtained that are suitable for the application of the liquid crystal display. As described above, with the present embodiment it is possible to control the scattering directivity by adjusting the rubbing direction and the twisting state of the liquid crystal. In addition, with the present invention the scattering has directivity, and consequently, a display that is bright and brilliant is obtained.

Second Embodiment

Figure 5:
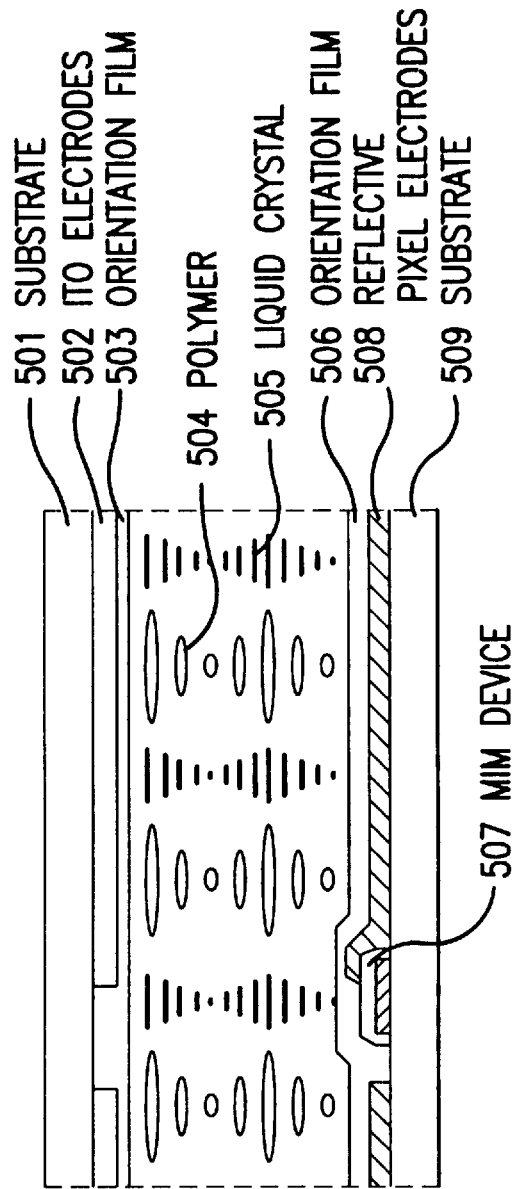
FIG. 5 is a cross-sectional view showing the liquid crystal display device of a second embodiment of the present invention.

An example of the second embodiment is provided hereafter. The second embodiment has the same structure as the first embodiment, but with the twisting angle of the liquid crystal taken to be about 270°, and a two terminal metal-insulator-metal (MIM) device formed on each pixel electrode. FIG. 5 shows the cross-sectional drawing of the liquid crystal display device of the second embodiment.

The bottom substrate 509 is a MIM substrate produced through a two-photo process. In the substrate production process, tantalum (Ta) was sputtered and then patterned (first photo procedure) into a desired shape. The Ta was then anodized and an insulating film of $Ta_2O_5$ was formed on the Ta surface. Next, chromium (Cr) was sputtered and was then patterned (second photo procedure) into a desired shape. Then, MIM devices 507 composed of $Ta-Ta_2O_5-Cr$ and reflective pixel electrodes 508 composed of Cr were formed. On the other hand, indium tin oxide (ITO) was sputtered on the top substrate 501 and was patterned into a stripe form. Then, ITO electrodes 502 were formed. Next, Optomer AL 3046 (produced by Japan Synthetic Rubber Co. Ltd.) was flexographed onto the bottom and top substrates 509 and 501 and then calcinated for about one hour at about 180° C., forming polyimide films 503 and 506. Next, a rubbing process was conducted on the bottom and top substrates 509 and 501 by means of a rotational rubbing apparatus. The rubbing direction was the same as that of the 270° twist orientation cell of the first embodiment (see FIG. 2D). The bottom and top substrates 509 and 501 thus obtained where bonded and sealed about the substrate perimeters with a separation of about 5 mm to produce a hollow panel having a 5 inch diagonal.

Next, a liquid crystal mixture material composed of a liquid crystal, a dichroic dye, a chiral component and a polymer precursor was vacuum sealed into the above-described hollow panel, the same as in the first embodiment. R-1011 (produced by Merck & Co. Inc.) was added in the amount of about 0.45% by weight as a chiral component in order to obtain the 270° twisting. The liquid crystal mixture material that was sealed into the hollow panel exhibited a right twisting 270° orientation state from the top substrate rubbing axis to the bottom substrate rubbing axis.

Following this, the panel was irradiated for about 7 minutes by ultraviolet rays having luminous intensity of about 5 mW/cm$^2$ (wavelength 350 nm), the polymer was separated from the liquid crystal mixture material, and the liquid crystal display device of the second embodiment as shown in FIG. 5 was completed. The liquid crystal 505 exhibited a right twisting 270° orientation state, the same as before ultraviolet ray irradiation. The fact that the polymer 504 and the liquid crystal 505 between the substrates took on a structure that was mutually orientated and dispersed was verified by a polarizing microscope.

When the liquid crystal display device thus obtained was MIM driven with about a 1/480 duty, the maximum reflectance was about 72% and the contrast ratio was about 15 under the measurement conditions of the first embodiment. In addition, a bright display was obtained in indoor environments because light from the upward direction of the panel could be efficiently scattered. Furthermore, when a non-gray process and a no-reflection coating were conducted onto the surface of this liquid crystal display device, pick up of surroundings images declined and the visibility improved dramatically.

With the second embodiment, reflective electrodes were placed on the MIM substrate, but it is also possible to form reflective electrodes on the opposing substrate.

Third Embodiment

Figure 6:
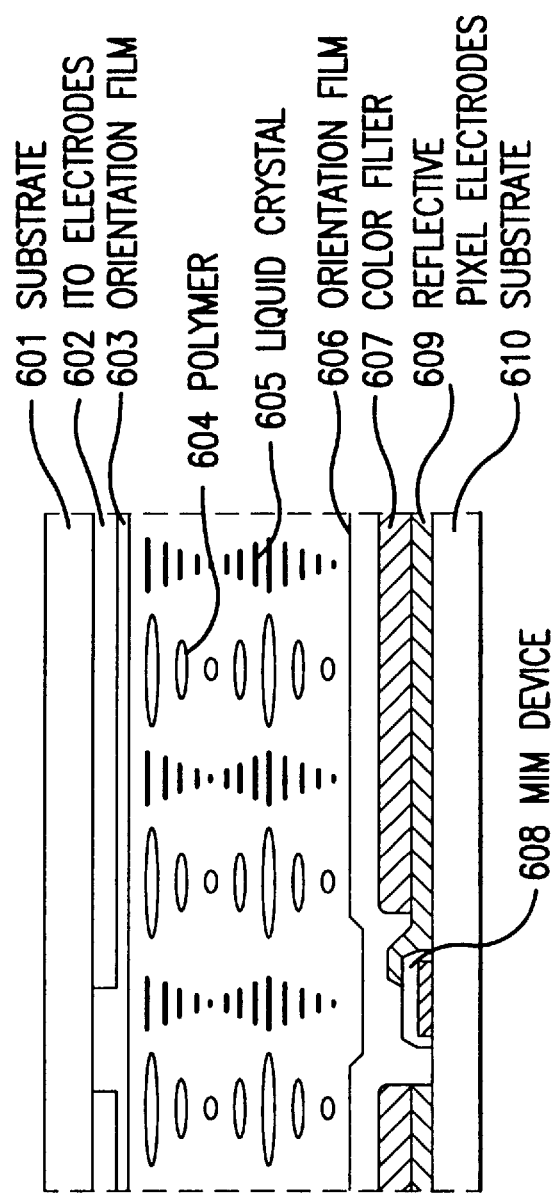
FIG. 6 is a cross-sectional view showing the liquid crystal display device of a third embodiment of the present invention.

In the third embodiment, a color filter is formed on the reflective electrodes in the structure of the second embodiment. FIG. 6 shows a cross-sectional view of the liquid crystal display device of the third embodiment. On a bottom substrate 610, wiring and a MIM device 608 and reflective pixel electrodes 609 were formed, the same as in the second embodiment. Pigment color filters 607 (red, green and blue) were formed at each pixel, respectively, on the reflective pixel electrodes 609. ITO electrodes 602 were formed on the top substrate 601, the same as in the second embodiment. The liquid crystal display device of the third embodiment was completed using the above-described substrates, the same as in the second embodiment. The rubbing directions and twisting angles also had the same conditions as in the second embodiment.

The liquid crystal display device thus obtained was such that a black display was obtained through absorption of light by the dichroic dye when the voltage was off, and a color display was obtained by impressing voltages on each color pixel.

In addition, when MIM driven at about a 1/480 duty, the maximum reflectance was about 24% and the contrast ratio was about 12 under the measurement conditions of the first embodiment. In addition, an 8 gradation display and 512 color display were possible. Furthermore, a bright display was obtained in indoor environments because light from the upward direction of the panel could be efficiently scattered. Finally, when a non-gray process and a no-reflection coating were conducted on the surface of the liquid crystal display device, the pick up of the surroundings declined and the visibility improved dramatically.

In the above embodiments, transparent electrodes were placed on the MIM substrate. However, it is also possible to place the reflective electrodes on the MIM substrate and to form color filters on the top of the reflective electrodes.

In addition, the composition of the color filters used in the embodiments is not restricted to red, green and blue. It is also possible to use compositions such that natural colors can be reproduced. In addition, the color filters can also be placed on the top substrate.

The preferred embodiments of the present invention were described above, but these are intended to be illustrative and not limiting.

For example, in the above-described embodiments 1 through 3, the structure was such that a dichroic dye was added to the liquid crystal. However, the dichroic dye need not be added. When the dichroic dye is not added, the black level rises somewhat when voltages are not impressed. However, the maximum reflectance increases when voltage is impressed because the light absorption by the dichroic dye disappears, so that brightness improves. In addition, when reflective electrodes with low reflectance are used, or when a light-absorbing layer is provided on the reflective electrode, it is particularly unnecessary to add the dichroic dye.

In addition, in the above-described embodiments 1 through 3, structures of the six levels of about 0°, 90°, 180°, 270°, 360° and 450° for the twisting angle were exhibited, and structures with about 270° as the twisting angle were exhibited in the second and third embodiments. However, this is intended to be illustrative and not limiting, for the structure may be selected appropriately in the range of about 0° to 450°, in accordance with the specific usage environment and application for the liquid crystal display device. In addition, the rubbing direction is determined by the twisting direction and twisting angle of the liquid crystal in accordance with the above-described principles. Finally, the scattering directivity has axial symmetry as shown in FIG. 4. Consequently, the rubbing directions of the top substrate and bottom substrate may be respectively rotated about 180°.

The chiral component, which determines the twisting angle, is added in the optimum amount in accordance with the desired twisting angle. For the chiral component, a material which is used in a normal TN or super twist nematic (STN) liquid crystal display device may be used.

In the above-described embodiments 1 through 3, a polyimide film was used as the alignment film for the parallel orientation process. However, a polyamide film, a silicon oxide (SiO) oblique vaporization film, a polyvinyl alcohol, or the like may also be suitably used.

As the material used in the substrates, it is preferable to use soda glass, quartz, non-alkali glass, silicon monocrystal, sapphire substrate, thermosetting polymer, thermoplasticizing polymer or the like. The polymer material used in the substrate is not particularly limited as long as it does not have a negative effect on the liquid crystal and polymer which are interposed between substrates. Thus, it is preferable to use polyethylene terephthalates (PET), polyethyl sulfone, epoxy hardening resin, phenoxy resin, polyallyl ether or the like.

In the above-described embodiments 1 through 3, the reflective electrodes were taken to be Cr, but it is also preferable to use a metal such as aluminum (Al), Cr, magnesium (Mg), silver (Ag), gold (Au), platinum (Pt) or the like, or alloys of these metals. In particular, Cr or an Al—Mg alloy are preferable from the standpoint of stability and reflectance, and in the case of the Al—Mg alloy, it is desirable for the amount of Mg added to be about 0.1 to 10% by weight.

For the liquid crystal, it is preferable to use a material that is normally used in liquid crystal display devices. However, in order to improve the degree of scattering, it is desirable for the multiple refractivity anisotropy, $\Delta n$, of the liquid crystal to be not less than about 0.15. In addition, in order to drive a non-linear device, it is preferable for the relative resistance value of the liquid crystal alone to be not less than about $1.0 \times 10^9 \Omega.cm$, and more preferably, not less than about $1.0 \times 10^{10} \Omega.cm$ in order to increase the retention rate and improve the display quality.

As the dichroic dye, it is preferable to use azo, anthraquinone, naphthoquinone, perylene, quinophthalone, azomethylene or the like that are normally used in the GH (guest-host) display format. Of these, from the standpoint of light-resistance, it is particularly preferable to use anthraquinone alone or a mixture of anthraquinone with another dye, as necessary. These dichroic dyes may be mixed depending on the necessary colors.

As polymer precursors, any material is acceptable as long as it exhibits refractivity anisotropy after polymerization and orientation disperses with the liquid crystal. However, from the standpoint of simplicity in the liquid crystal display device structure, it is desirable to use a ultraviolet ray-hardening monomer. As this ultraviolet ray-hardening monomer, it is preferable to use unifunctional methacrylate, bifunctional methacrylate or multifunctional methacrylate. In order to improve the degree of scattering, it is desirable for these monomers to contain a minimum of one benzene ring in the polymer structure. In particular, materials containing biphenyl, tar phenyl or quarter phenyl lattice may be used. These monomers may also contain a chiral component. In addition, these monomers may also polymerize after being irradiated with ultraviolet rays, either alone or after mixing with other monomers.

In addition, in above-described embodiments 2 and 3, MIM devices were used as the two terminal non-linear device, but it is also possible to use, besides MIM devices, lateral MIM devices, back-to-back MIM devices, MSI devices, diode-ring devices or varistor devices. In addition, it is also possible to use three terminal non-linear devices, and as the three terminal non-linear devices, it is possible to use polysilicon thin film transistor (TFT) devices, amorphous silicon TFT devices, cadmium-selenium (Cd—Se) TFT devices or the like.

INDUSTRIAL APPLICATIONS

As described above, with the present invention it is possible, in a polymer dispersion type of liquid crystal display device, which does not require a polarizing plate and is bright with no double images, to improve the brightness, particularly in a specific direction, as a reflective display. This improvement is accomplished by controlling the scattering directivity based on the rubbing direction, which is accomplished on the substrate, and the twisting state of the liquid crystal, which is mutually dispersed and twist orientated with a polymer. Furthermore, it is possible to adjust the viewing angle properties of the liquid crystal display device so that the viewing angle properties are suitable for the application of the equipment on which the liquid crystal display device has been mounted.

As a result, the present invention can be used in liquid crystal display devices suitable for portable applications for which numerous environments are predicted. In addition, it is possible to combine an active matrix with the above structure, and to use the present invention in reflective-type large capacity displays with superior display quality. Furthermore, by combining this with color filters, the present invention can be used in liquid crystal display devices which are capable of color display.

What is claimed is:

1. A liquid crystal display device, comprising:
   a top substrate having a first rubbing direction;
   a bottom substrate having a second rubbing direction; and
   a polymer dispersed liquid crystal having a twisting angle and a twist direction disposed between the top and the bottom substrates, wherein a light scattering directivity of the liquid crystal display device is within a plane defined by a direction normal to a surface of the top substrate and a predetermined direction on the top substrate surface, and is set by the twisting angle and the twist direction of the polymer dispersed liquid crystal, and by the first and the second rubbing directions of the top and the bottom substrates.

2. The liquid crystal display device of claim 1, wherein the predetermined direction is set by the first and the second rubbing directions of the top and the bottom substrates, the predetermined direction being a direction of a vector rotated from pointing in the first rubbing direction toward the second rubbing direction by about ½ of an angle formed by the first and the second rubbing directions of the top and the bottom substrates.

3. The liquid crystal display device of claim 2, wherein the predetermined direction is the vertical direction of the top substrate in a usage state of the liquid crystal display device.

4. The liquid crystal display device of claim 3, wherein the first rubbing direction of the top substrate is a direction of a vector rotated angularly by about ½ of the twisting angle of the polymer dispersed liquid crystal, from pointing in a left-to-right direction of the top substrate in the usage state of the liquid crystal display device to the twist direction of the polymer dispersed liquid crystal, and the second rubbing direction of the bottom substrate is a direction symmetric with the first rubbing direction with respect to the vertical direction of the top substrate.

5. The liquid crystal display device of claim 1, wherein the polymer dispersed liquid crystal contains a chiral component in a predetermined amount, the predetermined amount being set based on the twisting angle of the polymer dispersed liquid crystal.

6. The liquid crystal display device of claim 1, wherein the polymer dispersed liquid crystal contains a dichroic dye.

7. The liquid crystal display device of claim 1, wherein the top substrate comprises:
   a top backing plate;
   at least one first electrode formed over the top backing plate; and
   a first orientation film formed over the at least one first electrode, wherein the first orientation film is rubbed in the first rubbing direction.

8. The liquid crystal display device of claim 7, wherein the bottom substrate comprises:
   a bottom backing plate;
   at least one second electrode formed over the bottom backing plate; and
   a second orientation film formed over the at least one second electrode, wherein the second orientation film is rubbed in the second rubbing direction, the second rubbing direction and the first rubbing direction forming a predetermined angle.

9. The liquid crystal display device of claim 8, wherein the polymer dispersed liquid crystal scatters light when a voltage is applied between the at least one first electrode and a corresponding one of the at least one second electrode, the predetermined direction being a direction of a vector rotated from pointing in the first rubbing direction toward the second rubbing direction by approximately ½ of an angle formed between the first and the second rubbing directions.

10. The liquid crystal display device of claim 8, wherein the polymer dispersed liquid crystal is sealed between the top and the bottom substrates forming a hollow panel, the at least one first electrode of the top substrate facing the at least one second electrode of the bottom substrate.

11. The liquid crystal display device of claim 10, wherein the polymer dispersed liquid crystal comprises:
    a liquid crystal material; and
    a polymer material, the liquid crystal material and the polymer material having substantially similar refractive indexes and mutually dispersed orientations, wherein when a voltage is applied between the at least one first electrode and a corresponding one of the at least one second electrode, the mutually dispersed orientations of the liquid crystal material and the polymer material are made to differ, and points of discontinuity are generated in the refractive indexes of the polymer material and the liquid crystal material placing the polymer dispersed liquid crystal in a light scattering state.

12. The liquid crystal display device of claim 11, further comprising:
    a dichroic dye dispersed in the polymer dispersed liquid crystal, wherein when the voltage is removed from between the at least one first electrode and the corresponding one of the at least one second electrode, the dichroic dye absorbs the light producing a black display in the liquid crystal display device, and when the voltage is applied between the at least one first electrode and the corresponding one of the at least one second electrode, the dichroic dye stops absorbing the light producing a white display in the liquid crystal display device.

13. The liquid crystal display device of claim 7, wherein the bottom substrate comprises:
    a bottom backing plate;
    at least one pixel electrode formed over the bottom backing plate; and
    one of at least one metal-insulator-metal device connected to each of the at least one pixel electrode, the at least one metal-insulator-metal device driving each of the at least one pixel electrode at a duty cycle of about 1/480.

14. The liquid crystal display device of claim 13, further comprising:
    at least one color filter, one of the at least one color filter being formed over each of the at least one pixel electrode, when a voltage is applied between each of the at least one first electrode and corresponding ones of the at least one pixel electrode, the at least one color filter generating a color display.

15. The liquid crystal display device of claim 8, wherein the at least one second electrode of the bottom substrate is formed of a reflective material.

16. A method for producing a liquid crystal display device, comprising:

forming a top substrate having a first rubbing direction;

forming a bottom substrate having a second rubbing direction;

interposing between the top and the bottom substrates a polymer dispersed liquid crystal having a twisting angle and a twist direction; and setting a light scattering directivity of the liquid crystal display device to within a plane defined by a direction normal to a surface of the top substrate and a predetermined direction on the top substrate surface, by setting the twisting angle and the twist direction of the polymer dispersed liquid crystal and by the first and the second rubbing directions of the top and the bottom substrates.

17. The method of claim 16, further comprising:

forming at least one first electrode over the top substrate;

forming a first orientation film over the at least one first electrode;

rubbing the first orientation film in the first rubbing direction, the predetermined direction being a direction of a vector rotated angularly by about ½ of the twisting angle of the polymer dispersed liquid crystal from pointing in a left-to-right direction of the top substrate when in a usage state toward the twist direction of the polymer dispersed liquid crystal;

forming at least one second electrode over the bottom substrate;

forming a second orientation film over the at least one second electrode;

rubbing the second orientation film in the second rubbing direction, the second rubbing direction being linearly symmetrical with the first rubbing direction with respect to a vertical direction of the top substrate of the liquid crystal display device;

disposing a liquid crystal material and a polymer precursor between the top and the bottom substrates;

sealing the polymer precursor and the liquid crystal material between the top and the bottom substrate forming a hollow panel; and separating the polymer precursor from the liquid crystal material by polymerizing the polymer precursor to form the polymer dispersed liquid crystal.

18. The method of claim 17, further comprising:

dispersing a dichroic dye in the polymer dispersed liquid crystal wherein the dichroic dye orients in a same direction as the polymer dispersed liquid crystal when a voltage is applied between the at least one first electrode and the at least one second electrode.

19. The method of claim 17, further comprising:

forming at least one pixel electrode on the bottom substrate; and forming one of at least one metal-insulator-metal device on the bottom substrate, the one of the at least one metal-insulator-metal device connected to each of the at least one pixel electrode.

20. The method of claim 19, further comprising:

forming a color filter over each of the at least one pixel electrode.

21. The method of claim 16, wherein the polymer dispersed liquid crystal contains a chiral component in a predetermined amount, the predetermined amount based on a twisting angle of the polymer dispersed liquid crystal.

22. The method of claim 16, wherein an ultraviolet light hardening monomer is used as a polymer precursor and a polymer material is separated from a liquid crystal material by irradiating the polymer precursor with ultraviolet rays polymerizing the polymer precursor into the polymer material, thereby mutually separating the polymer material and the liquid crystal material.

* * * * *